United States Patent
Shin et al.

(10) Patent No.: US 11,722,307 B2
(45) Date of Patent: Aug. 8, 2023

(54) ELECTRONIC DEVICE FOR PROCESSING DIGITAL KEY, AND OPERATION METHOD THEREFOR

(71) Applicant: Samsung Electronics Co., Ltd., Gyeonggi-do (KR)

(72) Inventors: Inyoung Shin, Gyeonggi-do (KR); Sooyeon Jung, Gyeonggi-do (KR); Jonghyo Lee, Gyeonggi-do (KR); Taehyung Lim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 25 days.

(21) Appl. No.: 17/263,281

(22) PCT Filed: Jul. 17, 2019

(86) PCT No.: PCT/KR2019/008840
§ 371 (c)(1),
(2) Date: Jan. 26, 2021

(87) PCT Pub. No.: WO2020/045826
PCT Pub. Date: Mar. 5, 2020

(65) Prior Publication Data
US 2021/0288811 A1 Sep. 16, 2021

(30) Foreign Application Priority Data
Aug. 31, 2018 (KR) .................. 10-2018-0104022

(51) Int. Cl.
*H04L 9/32* (2006.01)
*H04L 9/40* (2022.01)

(52) U.S. Cl.
CPC .......... *H04L 9/3234* (2013.01); *H04L 9/3263* (2013.01); *H04L 9/3271* (2013.01); *H04L 63/0853* (2013.01)

(58) Field of Classification Search
CPC ... H04L 9/3234; H04L 9/3263; H04L 9/3271; H04L 63/0853; H04L 9/0866;
(Continued)

(56) References Cited

U.S. PATENT DOCUMENTS 8,458,462 B1* 6/2013 Hanna ................. H04L 63/10
726/10
9,978,060 B2 5/2018 Maddocks et al.
(Continued)

FOREIGN PATENT DOCUMENTS

DE    10 2016 207 339    11/2017
KR    1020140098872     8/2014
WO    WO 2016/054276    4/2016

OTHER PUBLICATIONS

European Search Report dated Jul. 30, 2021 issued in counterpart application No. 19856095.5-1218, 9 pages.
(Continued)

*Primary Examiner* — Kambiz Zand
*Assistant Examiner* — Yohannes Wallelign Minwuyelet
(74) *Attorney, Agent, or Firm* — The Farrell Law Firm, P.C.

(57) ABSTRACT

The disclosure relates to an electronic device for processing a digital key and an operation method thereof. The electronic device for processing a digital key may include a communicator configured to receive a request from a digital key framework, verify a package, a signature information of the package, and a certificate information of the target device based on a first authentication information received from the digital key framework and a second authentication information stored in the secure element, and generate the digital key by using configuration information included in the package.

8 Claims, 8 Drawing Sheets

(58) Field of Classification Search
CPC . H04L 9/0897; H04L 63/0823; H04L 63/083; H04L 67/12; H04L 63/166; H04L 2209/80; H04W 12/069; H04W 12/50; H04W 12/40; H04W 12/35; H04W 12/041
See application file for complete search history.

(56) References Cited

U.S. PATENT DOCUMENTS

| | | | |
|---|---|---|---|
| 9,984,360 | B2 | 5/2018 | Jooste |
| 2014/0214688 | A1 | 7/2014 | Weiner et al. |
| 2015/0213433 | A1* | 7/2015 | Khan ................ G06Q 20/3829 705/71 |
| 2016/0063490 | A1* | 3/2016 | Ziat ...................... G06Q 20/02 705/71 |
| 2017/0019792 | A1 | 1/2017 | Gargiulo |
| 2017/0347266 | A1 | 11/2017 | Petel |
| 2018/0018663 | A1 | 1/2018 | Van et al. |
| 2018/0213405 | A1 | 7/2018 | Jung et al. |
| 2019/0042773 | A1* | 2/2019 | Zhang .................. G06F 3/1226 |
| 2019/0138701 | A1 | 5/2019 | Bartels |
| 2021/0112407 | A1* | 4/2021 | Shin .................... H04W 12/069 |

OTHER PUBLICATIONS

International Search Report dated Oct. 23, 2019 issued in counterpart application No. PCT/KR2019/008840, pages.
European Search Report dated May 25, 2023 issued in counterpart application No. 19856095.5-1218, 9 pages.
Korean Office Action dated Feb. 26, 2023 issued in counterpart application No. 10-2018-0104022, 6 pages.

* cited by examiner

ELECTRONIC DEVICE FOR PROCESSING DIGITAL KEY, AND OPERATION METHOD THEREFOR

PRIORITY

This application is a National Phase Entry of PCT International Application No. PCT/KR2019/008840 which was filed on Jul. 17, 2019, and claims priority to Korean Patent Application No. 10-2018-0104022, which was filed on Aug. 31, 2018, the content of each of which is incorporated herein by reference.

TECHNICAL FIELD

The disclosure relates to an electronic device for processing a digital key and an operation method thereof.

BACKGROUND ART

As personalized electronic devices such as smart phones and tablet PCs have come into widespread use, technologies for performing security, authentication and the like using digital keys have been developed. As a digital key technology, a technology, in which a digital key is integrated into a mobile device, e.g., a smart phone, using wireless communication technology such as near-field communication (NFC), has been developed. That is, a digitized virtual key, i.e., a digital key, may be inserted into a mobile device and a user of the mobile device may use the digital key, so that a physical key may be replaced with the digital key to open or close, control, and access a door.

As such, use of digital keys will bring great improvements in user convenience and industrial effects but security concerns have been raised. That is, a digital key basically needs to be integrated with an electronic device and thus, is likely to be exposed to malicious use such as hacking of the electronic device. Accordingly, a technique for securely storing a digital key in an electronic device and accessing the digital key is needed.

A security level of the digital key is determined by a processing area of the electronic device. Security for a processing area of a general electronic device cannot be guaranteed. Therefore, a security level of the processing area of the general electronic device is not sufficient to process digital keys, e.g., generate, manage, delete, and use the digital keys. Therefore, it is necessary to process digital keys in an area with a high security level.

DESCRIPTION OF EMBODIMENTS

Technical Problem

The disclosure provides an electronic device for processing a digital key and an operation method thereof.

Solution to Problem

According to one aspect of the disclosure, an electronic device for processing a digital key includes a communicator configured to communicate with an external device; a secure element (SE) configured to store the digital key and perform processing related to the digital key; a memory storing a program and data for processing the digital key; and a processor configured to execute the program stored in the memory to: receive a request to process the digital key from a target device or a user application by using a digital key framework; transmit, to a digital key application of the secure element, the request to process the digital key and authentication information stored in the digital key framework; and process the digital key by using the digital key application executed in the secure element, based on the request to process the digital key, the authentication information received from the digital key framework, and authentication information stored in the secure element.

According to another aspect of the disclosure, an operation method of an electronic device for processing a digital key includes receiving a request to process the digital key from a target device or a user application by using a digital key framework; transmitting, to a digital key application of a secure element, the request to process the digital key and authentication information stored in the digital key framework; and processing the digital key by using the digital key application executed in the secure element, based on the request to process the digital key, the authentication information received from the digital key framework, and authentication information stored in the secure element.

Advantageous Effects of Disclosure

An embodiment of the disclosure provides an electronic device for processing a digital key and an operation method thereof.

BEST MODE

Figure 1:
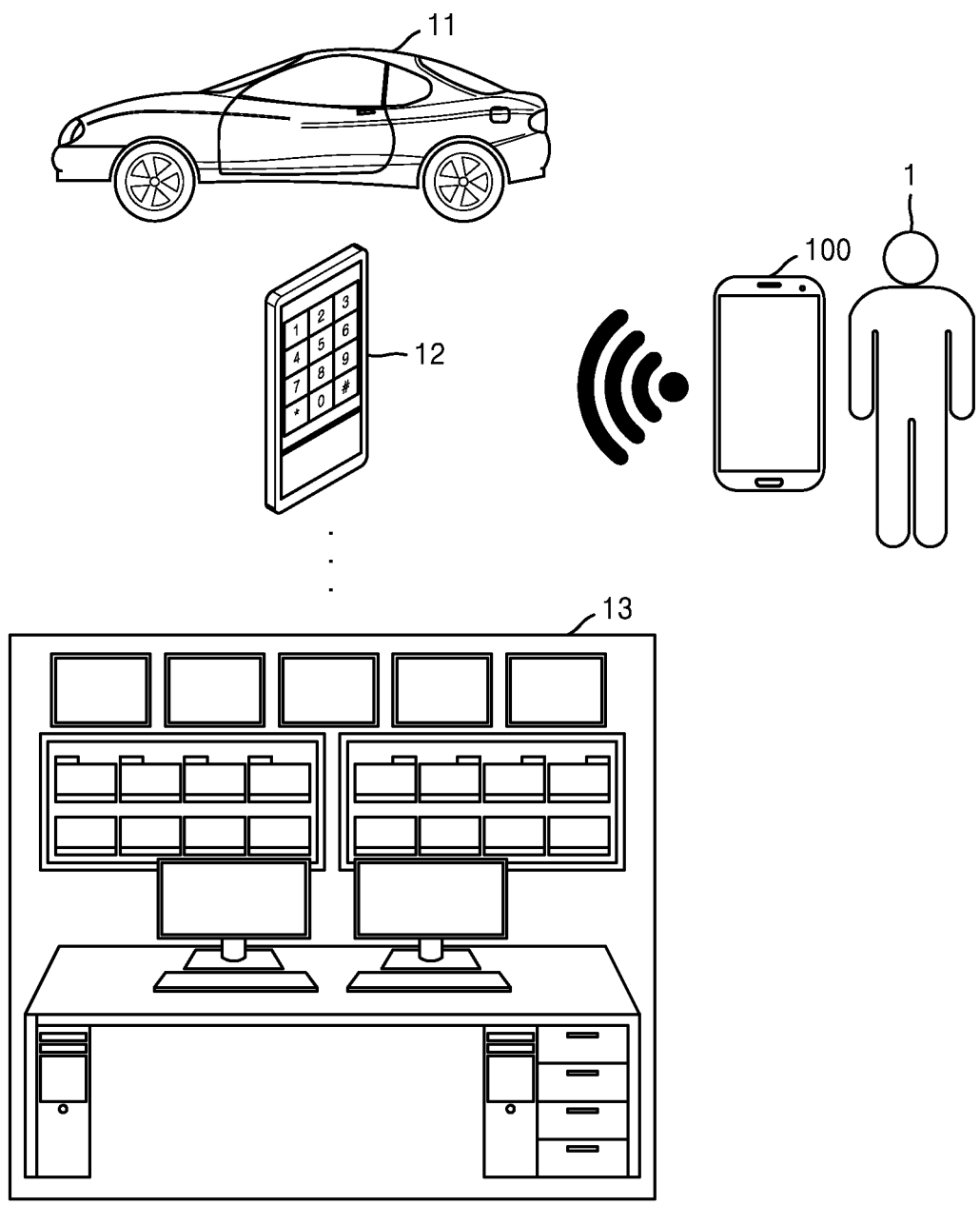
FIG. 1 is a diagram for describing an environment to which a digital key is applied.

According to one aspect of the disclosure, an electronic device for processing a digital key includes a communicator configured to communicate with an external device; a secure element (SE) configured to store the digital key and perform processing related to the digital key; a memory storing a program and data for processing the digital key; and a processor configured to execute the program stored in the memory to: receive a request to process the digital key from a target device or a user application by using a digital key framework; transmit, to a digital key application of the secure element, the request to process the digital key and authentication information stored in the digital key framework; and process the digital key by using the digital key application executed in the secure element, based on the request to process the digital key, the authentication information received from the digital key framework, and authentication information stored in the secure element.

In an embodiment of the disclosure, the processing of the digital key may include at least one operation of creating the digital key, deleting the digital key, or managing the digital key.

In an embodiment of the disclosure, the processor may be further configured to: receive a request to generate the digital key from the target device by using the digital key framework, the request including a package including configuration information for generating the digital key and challenge information for preventing reuse of commands, signature information of the package, and certificate information of the target device; transmit, to the digital key application of the secure element, the authentication information, which is stored in the digital key framework to verify the package, the signature information of the package and the certificate information of the target device, and the request to generate the digital key; verify the package, the signature information of the package, and the certificate information of the target device by using the digital key application executed in the secure element, based on the authentication information received from the digital key framework and authentication information stored in the secure element; and generate the digital key by using the configuration information included in the package to generate the digital key.

In an embodiment of the disclosure, the digital key may be stored in the secure element.

In an embodiment of the disclosure, the processor may be further configured to: receive a request to manage the digital key stored in the secure element from the target device by using the digital key framework; check whether a service provider transmitting the request to manage the digital key is an authorized service provider; transmit, to the digital key application of the secure element, the authentication information, which is stored in the digital key framework to verify the request to manage the digital key, and the request to manage the digital key; verify the request to manage the digital key by using the digital key application executed in the secure element, based on the authentication information received from the digital key framework and authentication information stored in the secure element; and manage the digital key.

In an embodiment of the disclosure, the processor may transmit a result of processing the digital key to a service provider server.

According to another aspect of the disclosure, an operation method of an electronic device for processing a digital key includes receiving a request to process the digital key from a target device or a user application by using a digital key framework; transmitting, to a digital key application of a secure element, the request to process the digital key and authentication information stored in the digital key framework; and processing the digital key by using the digital key application executed in the secure element, based on the request to process the digital key, the authentication information received from the digital key framework, and authentication information stored in the secure element.

In an embodiment of the disclosure, the processing of the digital key may include at least one operation of creating the digital key, deleting the digital key, or managing the digital key.

In an embodiment of the disclosure, the receiving of the request to process the digital key from the target device by using the digital key framework may include receiving a request to generate the digital key from the target device by using the digital key framework, the request including a package including configuration information for generating the digital key and challenge information for preventing reuse of commands, signature information of the package, and certificate information of the target device.

In an embodiment of the disclosure, the transmitting of the request to process the digital key and the authentication information stored in the digital key framework to the digital key application of the secure element may include transmitting, to the digital key application of the secure element, the authentication information, which is stored in the digital key framework to verify the package, the signature information of the package and the certificate information of the target device, and the request to generate the digital key, and the processing of the digital key by using the digital key application executed in the secure element may include verifying the package, the signature information of the package, and the certificate information of the target device by using the digital key application executed in the secure element, based on the authentication information received from the digital key framework and authentication information stored in the secure element; and generating the digital key by using the configuration information, which is included in the package to generate the digital key.

In an embodiment of the disclosure, the digital key may be stored in the secure element.

In an embodiment of the disclosure, the receiving of the request to process the digital key from the target device by using the digital key framework may include receiving a request to manage the digital key stored in the secure element from the target device by using the digital key framework; the transmitting of the request to process the digital key and the authentication information stored in the digital key framework to the digital key application of the secure element may include checking whether a service provider transmitting the request to manage the digital key is an authorized service provider, and transmitting, to the digital key application of the secure element, the authentication information, which is stored in the digital key framework to verify the request to manage the digital key, and the request to manage the digital key; and the processing the digital key by using the digital key application executed in the secure element may include verifying the request to manage the digital key by using the digital key application executed in the secure element, based on the authentication information received from the digital key framework and authentication information stored in the secure element, and managing the digital key.

In an embodiment of the disclosure, the operation method may further include transmitting a result of processing the digital key to a service provider server.

MODE OF DISCLOSURE

Hereinafter, embodiments of the disclosure will be described in detail with reference to the accompanying drawings so that the embodiments of the disclosure may be easily implemented by those of ordinary skill in the art. However, the disclosure may be embodied in many different forms and is not limited to the embodiments of the disclosure set forth herein. For clarity, parts not related to describing the disclosure are omitted in the drawings and like components are denoted by like reference numerals throughout the specification.

Some embodiments of the disclosure may be represented by functional block configurations and various operations. Some or all of the functional blocks may be implemented by various numbers of hardware and/or software configurations for performing certain functions. For example, the functional blocks of the disclosure may be implemented by one or more microprocessors or by circuit configurations for a certain function. For example, the functional blocks of the disclosure may be implemented in various programming or scripting languages. The functional blocks may be implemented in an algorithm executed by one or more processors. In the disclosure, the prior art may be employed for electronic configuration, signal processing, and/or data processing.

In addition, lines or members connecting elements illustrated in the drawings are merely illustrative of functional connections and/or physical or circuit connections. In an actual device, the connections between components may be represented by various functional connections, physical connections, or circuit connections that are replaceable or added.

Terms such as "unit", "module," and the like, when used herein, represent units for processing at least one function or operation, which may be implemented by hardware, software, or a combination of hardware and software. "Units" and "modules" may be stored in an addressable storage medium and may be implemented by a program executable by a processor. For example, "units" and "modules" may be implemented by, for example, components, such as software components, object-oriented software components, class components, and task components, processes, functions, attributes, procedures, subroutines, segments of program code, drivers, firmware, microcode, a circuit, data, database, data structures, tables, arrays, and parameters.

FIG. 1 is a diagram for describing an environment to which a digital key is applied.

FIG. 1 illustrates an electronic device 100, a user 1 of the electronic device 100, and target devices 11, 12, . . . , 13 for performing control and access using a digital key installed in the electronic device 100.

The electronic device 100 may include a personalized mobile device, but is not limited thereto and may include various types of electronic devices. For example, the electronic device 100 may include a smart phone, a tablet PC, a PC, a camera, a wearable device, etc. In an embodiment of the disclosure, the electronic device 100 may include a secure area, and the secure area may perform processes, such as creating, deleting, and managing a digital key for controlling or accessing an external device, and authenticate the digital key.

The target devices 11, 12, . . . , 13 may interact with the electronic device 100 to perform an operation for creating a digital key, and may be controlled and accessed using a digital key generated through this process and stored in the secure element of the electronic device 100.

For example, when the target device 11 is a vehicle, the user 1 may interact with the vehicle 11 through the electronic device 100 to generate a digital key and store the digital key in the secure element of the electronic device 100. The user 1 may control various operations of the vehicle 11 by using the digital key stored in the secure element of the electronic device 100. For example, the user 1 may use the digital key to open or close a door, start an engine, and control various electronic devices mounted in the vehicle 11. Furthermore, an operation related to autonomous driving such as an automatic parking system may be controlled. When the target device is a door lock 12, the user 1 may lock or unlock the door lock 12 by using a digital key. When the target device is a control system 13, the control system 13 may authenticate the user 1 by using a digital key and provide different levels of rights to the user 1 according to the authenticated user 1.

The embodiments of the disclosure illustrated in FIG. 1 are only examples, and the scope of the disclosure is not limited thereto. For example, there may be various target devices other than the target devices 11, 12, . . . , 13 of FIG. 1.

Figure 2:
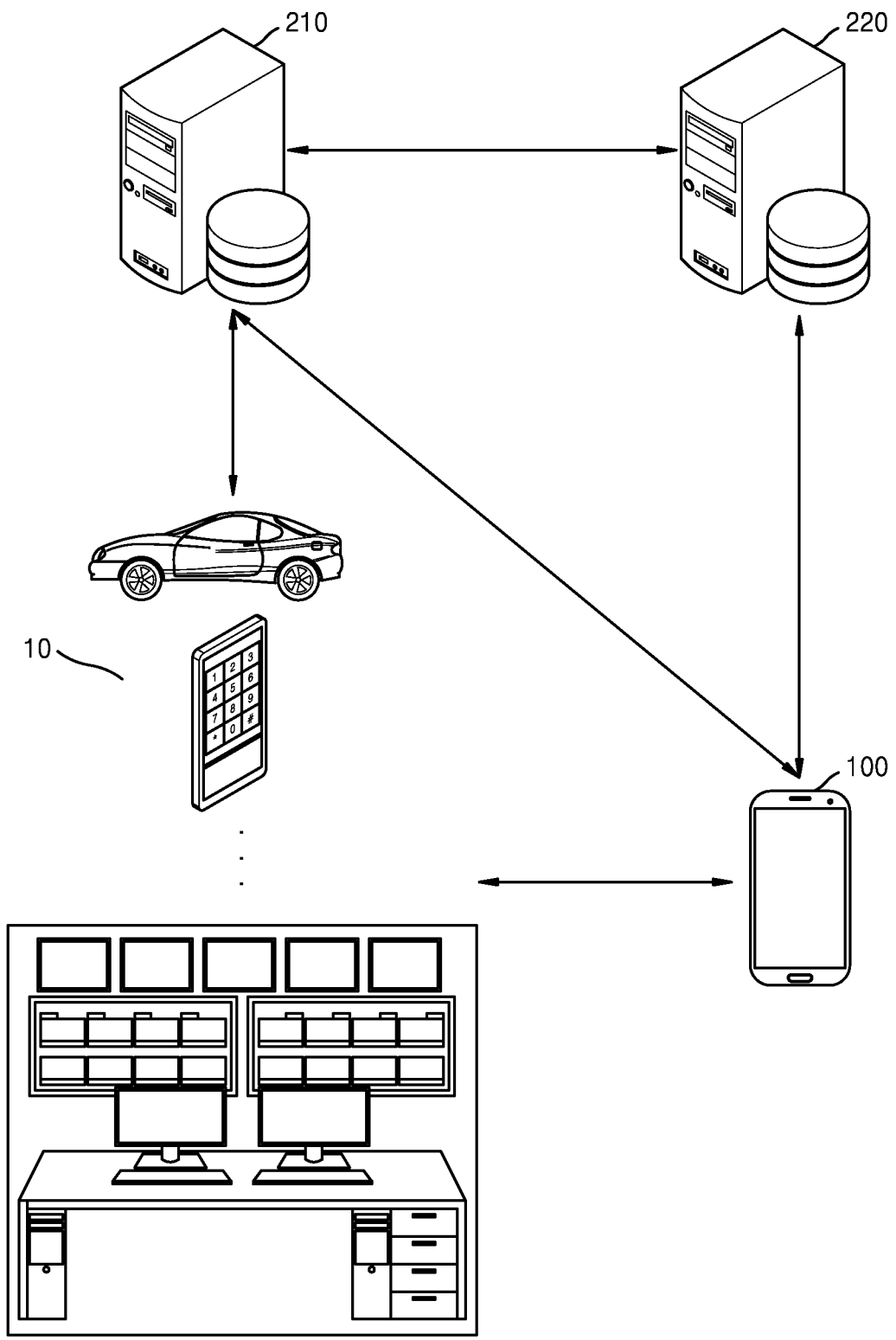
FIG. 2 is a diagram for describing a system for implementing a service using a digital key.

FIG. 2 is a diagram for describing a system for implementing a service using a digital key.

FIG. 2 illustrates a service provider server 210, a digital key service manager server 220, an electronic device 100, and a target device 10.

The service provider server 210 is a server of a service provider that provides a digital key service to the user 1. The service provider refers to a business operator that provides services related to, e.g., vehicles, hotels, houses, buildings, etc. and may provide the user 1 with a digital key service as an additional service according to a main service. For example, an automobile company sells cars, and a hotel, house, and building company provides services related to hotels, houses, and buildings. Such a service provider may provide digital key services for access functions, e.g., a function of opening or closing a door, a function of starting an engine, a control function, and the like.

The service provider server 210 may include user account information such as identification (ID) and a password of the user 1, and a database of user information such as sales product or service information. For example, when an automobile company sells a vehicle to the user 1, the automobile company may store information such as the ID and password of the user 1, the ID number of the vehicle, information about whether a digital key service is used, and the like.

The digital key service manager server 220 provides the electronic device 100 with technology and services for safely issuing and storing digital keys. For example, when the user 1 purchases a vehicle and wants to store a digital key in the electronic device 100, the electronic device 100 may generate and store a digital key and manage the stored digital key after checking whether the user 1 is a valid user or the vehicle is a valid vehicle.

The target device 10 is an entity corresponding to a product and services sold to the user 1 by a service provider. For example, the target device 10 may include gates of a vehicle, a hotel, a house, or a building. More specifically, the target device 10 may include not only gates for the doors and trunk of the vehicle but also access gates for starting an engine and vehicle control.

As described above, the electronic device 100 may include various types of electronic devices. In an embodiment of the disclosure, the electronic device 100 may include a secure element, and the secure element may generate, delete, and manage a digital key for controlling and accessing the target devices 11, 12, . . . , 13 and may authenticate the digital key. Furthermore, the secure element may provide functions of authenticating access of an external entity, e.g., the service providing server 210, to the digital key and verifying rights of the external entity to securely manage the digital key.

FIG. 2 illustrates an example of a system for implementing services using a digital key, and services using a digital key are not limited thereto and may be implemented in various ways.

Figure 3:
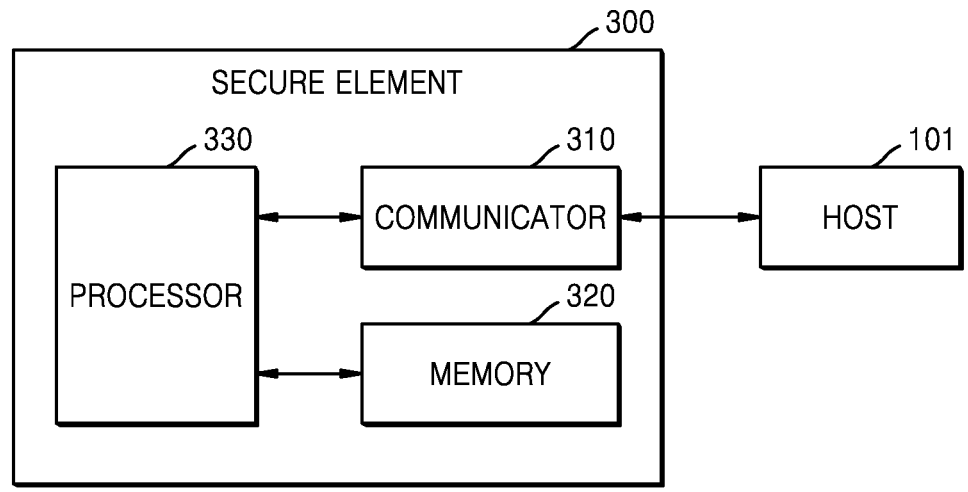
FIG. 3 is a diagram illustrating a configuration of a secure element for processing a digital key, according to an embodiment of the disclosure.

FIG. 3 is a diagram illustrating a configuration of a secure element for processing a digital key according to an embodiment of the disclosure.

Referring to FIG. 3, a secure element 300 may include a communication interface 310, a memory 320, and a processor 330.

The secure element 330 is an independent and secure storage device of the electronic device 100 and is a secure area accessible only by authenticated applications. The secure element 300 may be configured to be physically isolated from other hardware components. In an embodiment of the disclosure, the secure element 300 may include an embedded Secure Element (eSE), a Universal Integrated Circuit Card (UICC), a Secure Digital (SD) card, an embedded UICC (eUICC), and the like.

The communication interface 310 may communicate with a host 101. In an embodiment of the disclosure, the communication interface 310 may include at least one of various wired/wireless communication interfaces for communicating with the host 101. Here, the host 101 may be one of devices included in the electronic device 100 and may include, for example, an application processor (AP), a memory, and the like. The communication interface 310 may be, for example, a serial interface, such as ISO 7816, Universal Serial Bus (USB), Inter-Integrated Circuit ($I^2C$), Serial Peripheral Interface (SPI), or Single Wire Protocol (SWP), or a serial interface generally used for communication between two hardware devices. Alternatively, the communication interface 310 may be a wireless interface, such as ISO 14443, ZigBee or Bluetooth, which directly connects an antenna to a hardware device. Furthermore, the communication interface 310 may be a parallel interface connected to a central bus BUS of the electronic device 100, and may include a buffer to receive commands and data from the host 101 in this case.

Various types of data such as programs, e.g., an application, and files may be installed and stored in the memory 320. The processor 330 may access and use the data stored in the memory 320 or store new data in the memory 320. In an embodiment of the disclosure, a program and data for processing a digital key may be installed and stored in the memory 320.

The processor 330 may control overall operations of the secure element 300 and may include at least one processor such as a CPU or a GPU. The processor 330 may control the other components included in the secure element 300 to perform an operation for processing a digital key. For example, the processor 330 may execute a program stored in the memory 320, read a file stored in the memory 320, or store a new file in the memory 320. In an embodiment of the disclosure, the processor 330 may execute a program stored in the memory 320 to perform an operation for processing a digital key.

Figure 4:
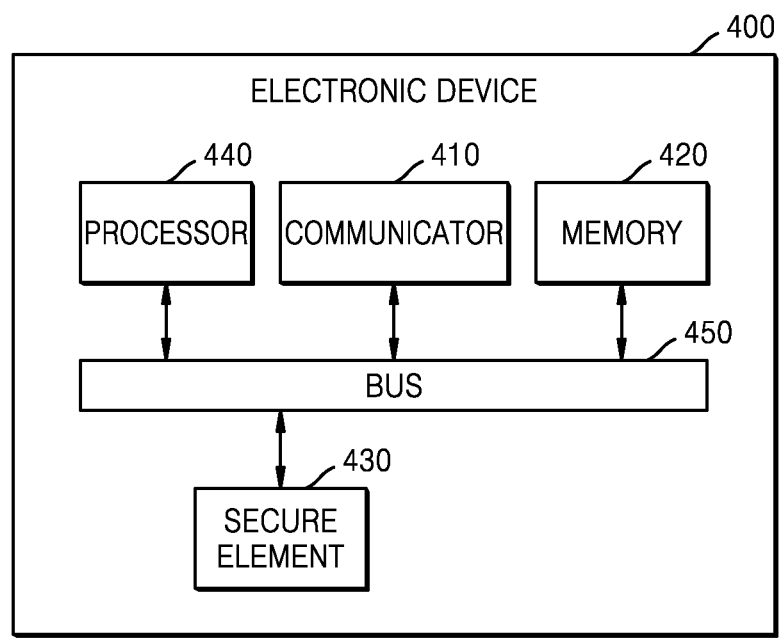
FIG. 4 is a diagram illustrating a configuration of an electronic device for processing a digital key, according to an embodiment of the disclosure.

FIG. 4 is a diagram illustrating a configuration of an electronic device for processing a digital key according to an embodiment of the disclosure.

Referring to FIG. 4, an electronic device 400 may include a communicator 410, a memory 420, a secure element 430, a processor 440, and a bus 450 connecting these components.

The communicator 410 may perform wired or wireless communication with another device or a network. To this end, the communicator 410 may include a communication module supporting at least one of various wired and wireless communication methods. For example, the communication module may be in the form of a chipset or may be a sticker/barcode (e.g. a sticker with an NFC tag) storing information necessary for communication.

The wireless communication may include, for example, at least one of cellular communication, Wireless Fidelity (W-Fi), Wi-Fi Direct, Bluetooth, Ultra Wide Band (UWB) or Near-Field Communication (NFC). The wired communication may include, for example, at least one of USB or high-definition multimedia interface (HDMI).

In an embodiment of the disclosure, the communicator 410 may include a communication module for short-range communication. For example, the communicator 410 may include a communication module for establishing various short-range communications such as infrared communication and magnetic secure transmission (MST) communication, as well as Wi-Fi, Wi-Fi Direct, Bluetooth, and NFC described above.

Various types of data such as programs, e.g., an application, and files may be installed and stored in the memory 420. The processor 440 may access and use the data stored in the memory 420 or store new data in the memory 420. In an embodiment of the disclosure, a program and data for processing a digital key may be installed and stored in the memory 420.

The secure element 430 is an independent and secure storage device of the electronic device 400 and is a secure area accessible only by authenticated applications as described above. The secure element 430 may be configured to be physically isolated from other hardware components. In an embodiment of the disclosure, the program and data for processing a digital key may be installed and stored in the secure element 430.

The processor 440 may control overall operations of the electronic device 400 and may include at least one processor such as a CPU or a GPU. The processor 440 may control the other components included in the electronic device 400 to perform an operation of storing a digital key. For example, the processor 440 may execute programs stored in the memory 420 and the secure element 430, read a file stored therein, or store a new file therein.

In an embodiment of the disclosure, the processor 440 may receive a request to process a digital key from a target device or a user application by using a digital key framework; transmit the request to process the digital key and authentication information stored in the digital key framework to a digital key application of the secure element 430; and process the digital key by using the digital key application executed in the secure element 430, based on the request to process the digital key, the authentication information transmitted from the digital key framework and authentication information stored in the secure element 430. Here, the processing of the digital key may include at least one operation of creating the digital key, deleting the digital key, or managing the digital key.

In an embodiment of the disclosure, the processor 440 may receive a request to generate a digital key, which includes a package including configuration information for creating the digital key and challenge information for preventing reuse of commands, signature information of the package, and certificate information of a target device, from the target device by using the digital key framework; transmit authentication information, which is stored in the digital key framework to verify the package, the certificate information of the package, and the certificate information of the target device, and the request to generate a digital key to a digital key application of the secure element 430; verify the package, the signature information of the package, and the certificate information of the target device by using the digital key application executed in the secure element 430, based on authentication information transmitted from the digital key framework and the authentication information stored in the secure element 430; and generate a digital key by using the configuration information, which is included in the package to generate creating a digital key. The generated digital key may be stored in the secure element 430.

In an embodiment of the disclosure, the processor 440 may receive a request to manage a digital key stored in the secure element 430 from a target device by using the digital key framework; verify whether a service provider transmitting the request to manage the digital key is an authorized service provider; transmit authentication information for verifying a command to manage the digital key, which is stored in the digital key framework, and the request to manage the digital key to a digital key application of the secure element 430; and verify the request to manage the digital key and manage the digital key by using the digital key application executed in the secure element 430, based on the authentication information transmitted from the digital key framework and the authentication information stored in the secure element 430.

In an embodiment of the disclosure, the processor 440 may transmit a result of processing the digital key to the service provider server.

The bus BUS 450 is a common data transmission path connecting the communicator 410, the memory 420, the secure element 430, and the processor 440.

Figure 5:
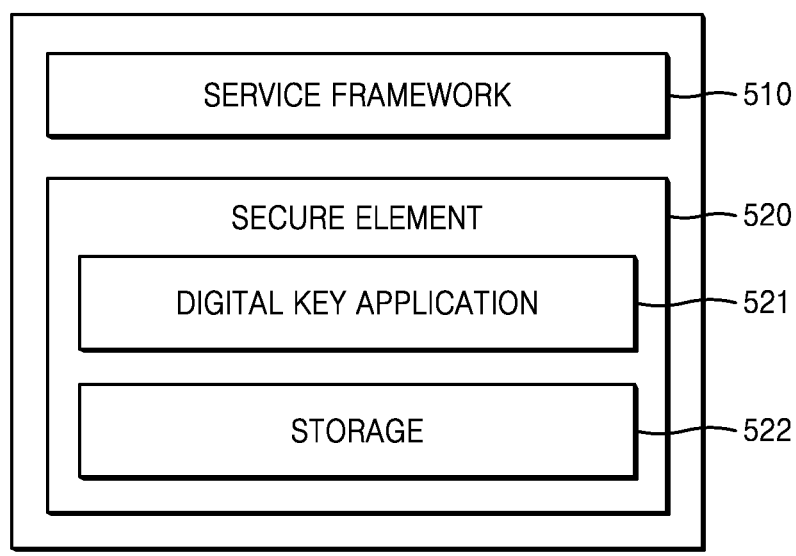
FIG. 5 is a diagram illustrating a system architecture of an electronic device including a secure element, according to an embodiment of the disclosure.

FIG. 5 is a diagram illustrating a system architecture of an electronic device including a secure element according to an embodiment of the disclosure.

Referring to FIG. 5, an electronic device 500 includes a service framework 510 and a secure element 520. Here, the secure element 520 may correspond to the secure element 300 of FIG. 3 or the secure element 430 of FIG. 4.

The service framework 510 is a service application serving as a gateway when the secure element 430 is accessed by an external entity. The service framework may provide an Application Programming Interface (API) accessible by an external entity, and provide functions, such as access control for accessing the secure element 520 and a command conversion function. The external entity may be, for example, a user application installed in an operating system (Android, iOS or the like) of a portable terminal, an external server or the like.

The secure element 520 is an independent and secure storage device of the electronic device 100 and is a secure area accessible only by authenticated applications. The secure element 520 may be configured to be physically isolated from other hardware components. In an embodiment of the disclosure, the secure element 520 may include an embedded Secure Element (eSE), a Universal Integrated Circuit Card (UICC), a Secure Digital (SD) card, an embedded UICC (eUICC), and the like.

The digital key application 521 is a lightweight application or applet installed and driven in the secure element 520. The digital key application 521 may generate a digital key, store the digital key in a storage 522 inside the secure element 520, and provide services for using, deleting, and managing the digital key and the like in a common form to various service providers. The digital key application 521 may be mounted in advance in the secure element 520 or loaded or installed therein later as needed.

In an embodiment of the disclosure, the digital key application 521 may include components having various functions, e.g., a session manager, a command processor, a secure channel manager, an event log recorder, a service-provider service performance manager, a digital key manager, a digital key use determiner, a digital key sharing manager, a common secure module, an authentication executor, a digital key use/access policy manager, and the like.

Programs and data for processing digital keys may be installed and stored in the storage 522 included in the secure element 520.

These components may be embodied as hardware or software components or a combination of hardware and software components, and may be implemented by a program stored in a storage medium and executable by a processor. However, the above-described components of the digital key application 521 are only examples, and thus, the digital key application 521 may be configured in a variety of other forms, including, for example, only some of the components or further including other components.

Figure 6:
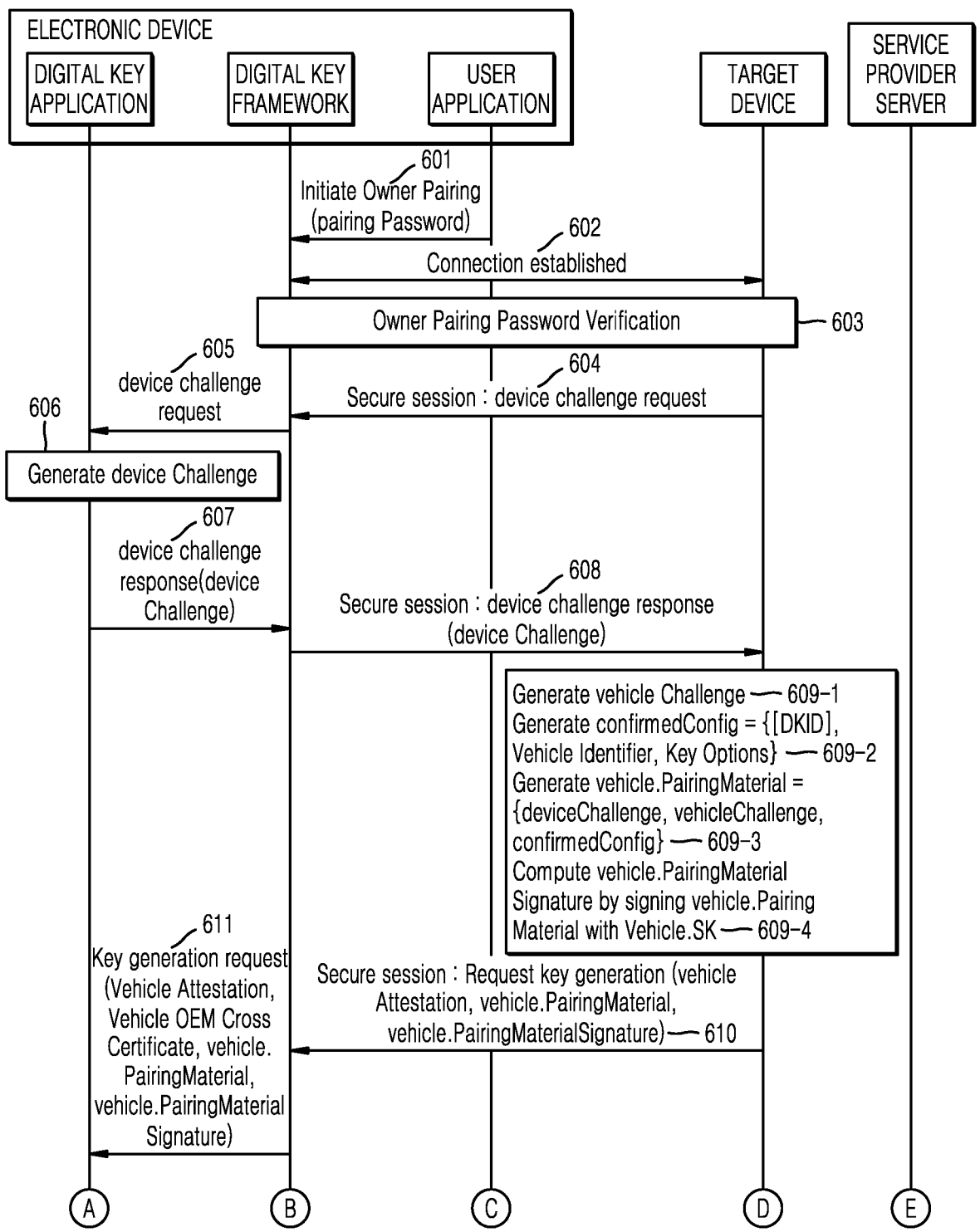
FIGS. 6 and 7 are diagrams illustrating an operation method of an electronic device to generate a digital key, according to an embodiment of the disclosure.
Figure 7:
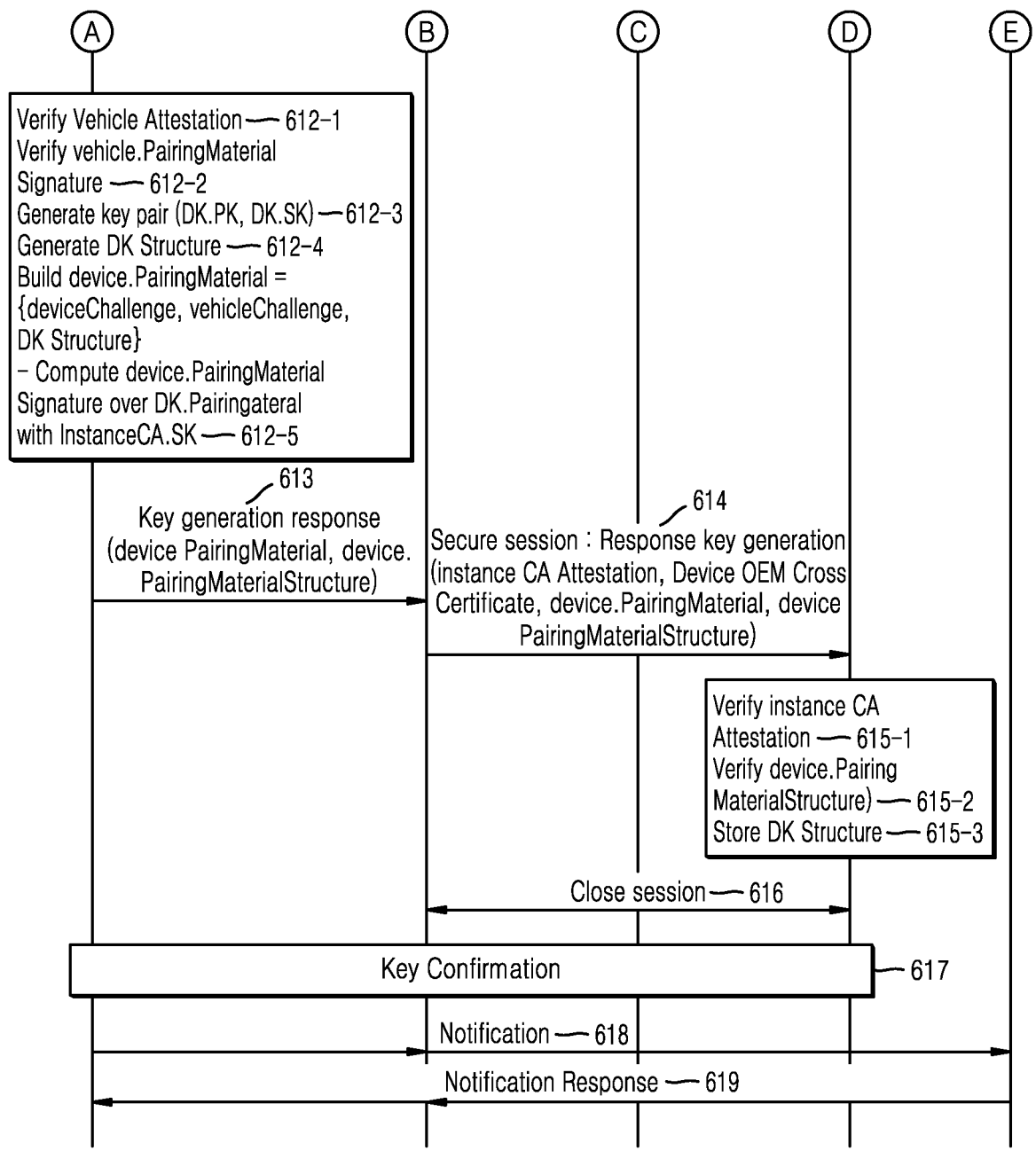

FIGS. 6 and 7 are diagrams illustrating an operation method of an electronic device to generate a digital key, according to an embodiment of the disclosure.

Referring to FIGS. 6 and 7, first, in operation 601, an electronic device starts owner pairing. In an embodiment of the disclosure, the electronic device may receive a password given by a user from a service provider through a user application and transmit the password to a digital key (DK) framework.

Next, in operation 602, the digital key framework of the electronic device establishes a communication connection with a target device. In this case, the electronic device may establish communication with the target device by using various types of short-range communication, e.g., infrared communication and magnetic secure transmission (MST) communication, as well as Wi-Fi, Wi-Fi Direct, Bluetooth, and NFC.

In operation 603, the digital key framework of the electronic device authenticates the password received in operation 601.

Thereafter, in operation 604, the digital key framework of the electronic device receives an electronic-device challenge request (deviceChallenge) from the target device. In an embodiment of the disclosure, the electronic device and the target device may prevent reuse of a command to generate a key through a challenge mutually generated therebetween. Here, the challenge refers to a process of identifying information between the target device and the electronic device, for example, by verifying the other party through identification of a certificate.

In operation 605, the digital key framework of the electronic device transmits the electronic-device challenge request deviceChallenge received in operation 604 to a digital key application of a secure element.

Thereafter, in operation 606, the digital key application of the secure element generates an electronic device challenge according to the electronic device challenge request device-Challenge. In operation 607, the digital key application of the secure element transmits the generated electronic device challenge to the digital key framework of the electronic device. In operation 608, the digital key framework of the electronic device transmits the electronic device challenge to the target device.

In operation 609, the target device also generates a target device challenge (609-1). In an embodiment of the disclosure, when the target device is a vehicle, the vehicle may generate a target device challenge (vehicleChallenge). In addition, the target device generates configuration information (confirmedConfig) which is a set of values necessary to generate a digital key (609-2). The electronic device may receive the configuration information (confirmedConfig) generated by the target device, and generate a digital key structure based on the configuration information (confirmedConfig).

In an embodiment of the disclosure, the target device may generate target device.PairingMaterial which is a result of packaging the electronic device challenge (deviceChallenge), the target device challenge (vehicleChallenge), and the configuration information (confirmedConfig)(609-3). When the target device is a vehicle, vehicle.PairingMaterial may be generated. In addition, the target device may sign a target device.PairingMaterial (vehicle.PairingMaterial) by using a target device secret key (target device.SK or Vehicle.SK) among a pair of uniquely generated target device public key/target device secret key (target device.PK/target device.SK or Vehicle.PKNehicle.SK)Vehicle.PKNehicle.SK), and generates a target device.PairingMaterialSignature (vehicle.PairingMaterialSignature) (609-4).

Then, in operation 610, the target device transmits the generated target device.PairingMaterial(vehicle.PairingMaterial) and target device.PairingMaterialSignature (vehicle.PairingMaterialSignature), and a target device attestation, which is a unique certificate stored in each target device, to the digital key framework of the electronic device. The target device attestation is a target device certificate signed by a service provider. In an embodiment of the disclosure, when the target device is a vehicle, the target device attestation may be a vehicle attestation, and the vehicle attestation may be a vehicle certificate signed by a vehicle manufacturer.

In operation 611, the digital key framework of the electronic device transmits the target device.PairingMaterial (vehicle.PairingMaterial) and the target device.PairingMaterialSignature(vehicle.PairingMaterialSignature) received in operation 610, and a service provider cross certificate, which is a service provider certificate for verifying a certificate chain of the target device attestation, to the digital key application of the secure element. The service provider cross certificate may be a certificate of a service provider authorized by a digital key service manager server, and is stored in the digital key framework of the electronic device after the certificate or a public key of the service provider is signed with a secret key matching a public key of a certificate provided by the digital key service manager server. For example, when the target device is a vehicle, a service provider cross certificate, which is a certificate of a service provider, may be a vehicle OEM cross certificate, which is a certificate of the manufacturer of the vehicle. The vehicle OEM cross certificate may be a certificate of the manufacturer of the vehicle authorized by the digital key service manager server, and is stored in the digital key framework of the electronic device after the certificate or a public key of the manufacturer is signed with a secret key matching a public key of a certificate (e.g., device OEM certificate) provided by the digital key service manager server.

In operation 612, the digital key application of the secure element performs certificate chain verification on the target device attestation, which is the target device certificate signed by the service provider (612-1). In an embodiment of the disclosure, the target device attestation may be verified with the service provider cross certificate, which is the certificate of the service provider. For example, when the target device is a vehicle, a vehicle attestation is signed by the manufacturer of the vehicle and thus may be verified with a vehicle OEM cross certificate which is a certificate of the manufacturer of the certificate.

In this case, the target device attestation may be verified with a certificate or public key, which is provided by the digital key service manager server and stored in the secure element. For example, the vehicle OEM cross certificate may be verified with the certificate (e.g., device OEM certificate) or the public key (e.g., device OEM.PK) provided by the digital key service manager server, which is stored in the secure element. In an embodiment of the disclosure, the certificate (e.g., device OEM certificate) or the public key (e.g., device OEM.PK) provided by the digital key service manager server is a highest-level certificate in certificate chain verification. The certificate chain verification should be performed by a highest-security-level component. In an embodiment of the disclosure, the certificate chain verification may be performed by the secure element with a highest security level among the components of the electronic device. When the certificate chain verification is performed by a component with a low security level, e.g., the digital key framework of the electronic device, the certificate chain verification may be exposed to a risk caused by memory flooding due to a security attack, incorrect service execution, or the like. In an embodiment of the disclosure, the certificate chain verification may be performed by the secure element with the highest security level among the components of the electronic device, thereby providing a more secure service.

After the certificate chain verification, the digital key application of the secure element verifies the target device.PairingMaterialSignature (e.g., vehicle.PairingMateralSignature) by using the certificate of the service provider (612-2). Thereafter, the digital key application of the secure element generates a pair of digital keys to be used for mutual verification when the target device is used. For example, when the target device is a vehicle, a pair of digital keys to be used for mutual verification to open or close a door of the vehicle door or to start an engine is generated (612-3). Furthermore, the digital key application of the secure element generates a digital key (DK) structure, which is a digital key package, based on the configuration information received from the target device (612-4). The digital key structure may include not only a public key of a newly generated digital key but also various values such as identification information (e.g., VIN) of the target device, digital key ID, management authority, etc. Next, PairingMaterial, including the DK structure and the target device challenge (e.g., vehicleChallenge), is generated(612-4). Thereafter, device.PairingMaterialSignature is generated by signing DK.PairingMaterial with an InstanceCA.SK key proving that the device.PairingMaterialSignature has been generated by the secure element of the electronic device. The Instance CA may include a pair of public key/private key of each service provider (e.g., a manufacturer of a vehicle), included in the secure element, and may be used as a tool for the service provider to verify an operation performed by the secure element of the electronic device.

In operation 613, the digital key application of the secure element may transmit the device.PairingMaterial and the device.PairingMaterialSignature to the digital key framework of the electronic device in response to operation 611.

Thereafter, in operation 614, the digital key framework of the electronic device transmits the device cross certificate and the instance CA attestation for performing certificate chain verification on the device.PairingMaterial and the device.PairingMaterialSignature to the target device. The device cross certificate is a certificate provided by the digital key service manager server, and the certificate or a public key provided by the digital key service manager server is signed by the service provider. The instance CA attestation is a certificate in which the Instance CA generated by the secure element is signed by the digital key service manager server.

In operation 615, the target device verifies the device.PairingMaterialSignature with the received Instance CA attestation (615-1). Thereafter, the instance CA attestation is verified with the device cross certificate (615-2). When all verifications are successful, the digital key structure is stored in the target device (615-3).

Next, in operation 616, the communication between the digital key framework of the electronic device and the target device is ended.

In operation 617, the digital key application of the secure element and the target device exchange and verify the public keys thereof corresponding to the secret key.

Thereafter, in operation 618, the digital key application of the secure element informs the server of the service provider (e.g., the manufacturer of a vehicle) of the generation of the digital key. In operation 619, the server of the service provider confirms the generation of the digital key, performs secondary verification, and transmits a result of the secondary verification to the digital key application of the secure element. This process may be performed when the electronic device is connected to a network.

Figure 8:
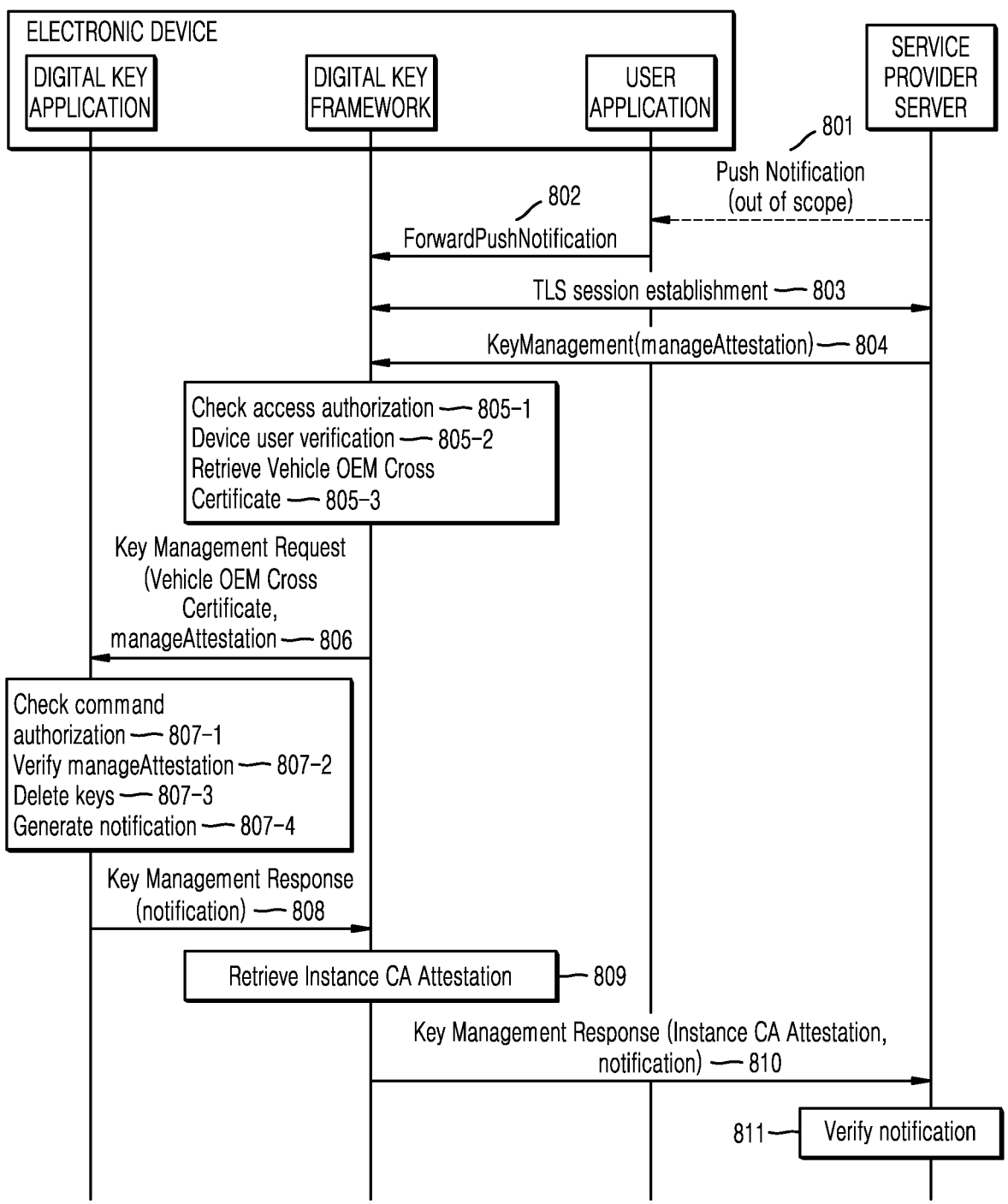
FIG. 8 is a diagram illustrating an operation method of an electronic device for processing a digital key, according to an embodiment of the disclosure.

FIG. 8 is a diagram illustrating an operation method of an electronic device for processing a digital key, according to an embodiment of the disclosure.

Referring to FIG. 8, in operation 801, a service provider server transmits, to an electronic device, a notification informing that there is a command to be transmitted to a user application. Next, in operation 802, the user application transmits the notification to a digital key framework of the electronic device.

In operation 803, the digital key framework of the electronic device establishes a TLS session, which is a secure session, with the service provider server. In operation 804, the service provider server transmits KeyManagement(manageAttestation), which is a command to manage a certain key, to the digital key framework of the electronic device. In an embodiment of the disclosure, the KeyManagement (manageAttestation) may be a value of a management command package signed by a secret key of a service provider. In an embodiment of the disclosure, management of a digital key may include operations such as activation/deactivation of the digital key, changing of attributes, and the like. Although it has been described above that the processing of the digital key may include generation, deletion, and management of the digital key, the management of the digital key may include deletion of the digital key.

Although FIG. 8 illustrates an operation of managing a certain key by a digital key framework according to a command to manage the key according to an embodiment, the management of the key may also apply to another operation of processing a key, e.g., deleting the key. For example, in order to delete a digital key stored in the electronic device, the service provider server may transmit Keydeletion(deleteAttestation) to the digital key framework of the electronic device instead of the KeyManagement (manageAttestation) of FIG. 8.

In operation 805, the digital key framework of the electronic device checks whether the service provider server that transmitted the KeyManagement(manageAttestation) is an authorized server (805-1). Thereafter, the digital key framework of the electronic device authenticates a user of a terminal according to the policies of the service provider or user settings (805-2). Furthermore, the digital key framework of the electronic device prepares to transmit a service provider cross certificate (e.g., vehicle OEM cross certificate) through which a digital key application of a secure element may verify the manageAttestation to the digital key application of the secure element (805-3). In an embodiment of the disclosure, the service provider cross certificate (e.g., vehicle OEM cross certificate) is a certificate of a service provider stored in the digital key framework of the electronic device after the certificate or a public key of the service provider authorized by a digital key service manager server to provide services is signed with a secret key matching a public key of a certificate provided by the digital key service manager server.

In operation 806, the digital key framework of the electronic device transmits a digital key management request to the digital key application of the secure element. In an embodiment of the disclosure, the digital key management request may include a manageAttestation (deleteAttestation in the case of a deletion request) and a service provider cross certificate (e.g., vehicle OEM cross certificate).

Thereafter, in operation 807, it is checked whether or not the digital key management request is permitted (807-1). Next, the digital key application of the secure element verifies the manageAttestation with the service provider cross certificate (e.g., vehicle OEM cross certificate) (807-2). The service provider cross certificate (e.g., vehicle OEM cross certificate) is verified with a certificate, which is a highest-level verification certificate stored in the digital key application of the secure element, or a public key provided by the digital key service manager server. In an embodiment of the disclosure, certificate chain verification may be performed by the secure element with a highest security level among the components of the electronic device, thereby providing a more secure service. In addition, the certificate chain verification may be performed in a most secure place, thereby managing the key safely from attacks on the digital key framework of the electronic device or the user application. When certificate chain verification is performed by a component with low security level, e.g., the digital key framework, security and management problems may occur in the digital key, which should be safely processed, due to unauthorized commands.

After the verification, the digital key application of the secure element manages the digital key (807-3), and generates a notification informing of the management of the digital key (807-4).

In operation 808, the digital key application of the secure element signs a result of the management with a secret key of Instance CA for each service provider and transmits a result of the signing the result of the management to the digital key framework of the electronic device, in response to operation 811.

In operation 809, the digital key framework of the electronic device prepares an instance CA attestation. In operation 810, the digital key framework transmits the instance CA attestation and the notification informing of the result of the verification to the service provider server so that the service provider server may verify the signed result of the management.

In operation 811, the service provider server performs chain verification on the signed result of the management with the instance CA attestation and the certificate provided by the digital key service manager server.

Figure 9:
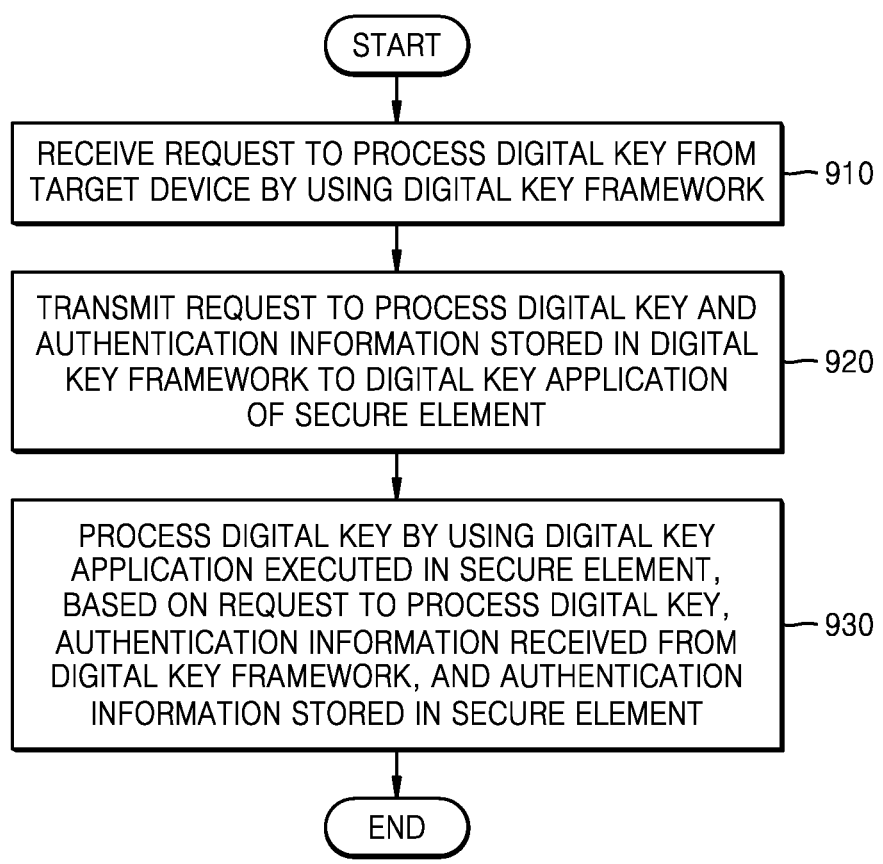
FIG. 9 is a flowchart of an operation method of an electronic device, according to an embodiment of the disclosure.

FIG. 9 is a flowchart of an operation method of an electronic device, according to an embodiment of the disclosure.

First, in operation 910, an electronic device receives a request to process a digital key from a target device by using a digital key framework. Here, the processing of the digital key may include at least one operation of creating the digital key, deleting the digital key, or managing the digital key.

In an embodiment of the disclosure, when the processing of the digital key is to generate the digital key, the electronic device uses the digital key framework to receive the request to generate the digital key, which includes a package including configuration information for generating the digital key and challenge information for preventing reuse of commands, signature information of the package, and certificate information of the target device.

In an embodiment of the disclosure, when the processing of the digital key is to delete the digital key, the electronic device may receive a request to delete the digital key stored in a secure element from the target device by using the digital key framework.

In operation 920, the electronic device transmits the request to process the digital key and authentication information stored in the digital key framework to a digital key application of the secure element.

In an embodiment of the disclosure, when the processing of the digital key is to generate the digital key, the electronic device may transmit authentication information, which is stored in the digital key framework to verify the package, the signature information of the package, and the certificate information of the target device, and the request to generate a digital key to the digital key application of the secure element.

In an embodiment of the disclosure, when the processing of the digital key is to delete the digital key, the electronic device may check whether the service provider transmitting a request to delete the digital key is an authorized service provider and transmit authentication information, which is stored in the digital key framework to verify a deletion command, and the request to delete the digital key to the digital key application of the secure element.

Thereafter, in operation 930, the electronic device processes the digital key by using the digital key application executed in the secure element, based on the request to process the digital key, the authentication information received from the digital key framework, and the authentication information stored in the secure element. Furthermore, the electronic device may transmit a result of processing the digital key to the service provider server.

In an embodiment of the disclosure, when the processing of the digital key is to generate the digital key, the package, the signature information of the package, and the certificate information of the target device may be verified using the digital key application executed in the secure element, based on the authentication information received from the digital key framework and the authentication information stored in the secure element, and the digital key may be generated using the configuration information, which is included in the package to generate a digital key.

In an embodiment of the disclosure, when the processing of the digital key is to delete the digital key, the electronic device may verify the request to delete the digital key by using the digital key application executed in the secure element, based on the authentication information received from the digital key framework and the authentication information stored in the secure element, and thereafter delete the digital key.

The above-described embodiments of the disclosure may be embodied as a computer executable program and implemented in a general-purpose digital computer for execution of the program by using a computer-readable recording medium. The data structures used in the above-described embodiments of the disclosure may be recorded on a computer-readable recording medium through various means. Furthermore, the above-described embodiments of the disclosure may be implemented in the form of a computer program product including a recording medium storing instructions executable by a computer such as program modules executable by a computer. For example, methods implemented by a software module or algorithm may be stored in a computer-readable medium in the form of codes or program instructions readable and executable by a computer.

The computer-readable medium may be any recording medium accessible by a computer and may include a volatile storage medium, a non-volatile storage medium, a removable storage medium, and a non-removable storage medium. The computer-readable medium may include, but is not limited to, a magnetic storage medium, such as a ROM, a floppy disk, a hard disk, or the like and an optical storage medium such as a CD-ROM, a DVD, or the like. Alternatively, the computer-readable medium may include a computer storage medium and a communication medium.

A plurality of computer-readable recording media may be distributed over network coupled computer systems, and data, e.g., program instructions and code, stored in the distributed computer-recording media may be executed by at least one computer.

While embodiments of the disclosure have been described above with reference to the accompanying drawings, it will be obvious to those of ordinary skill in the art that the disclosure may be embodied in many different forms without departing from the technical spirit or essential features thereof. Therefore, it should be understood that the embodiments of the disclosure described above are merely examples in all respects and not restrictive.

The invention claimed is:

1. An electronic device for processing a digital key, the electronic device comprising:
 a communicator configured to communicate with an external device;
 a secure element (SE);
 a first memory storing a first program and data for processing the digital key; and
 a first processor configured to execute the first program stored in the first memory to provide a digital key framework,
 wherein the digital key framework is configured to:
  receive a request to generate the digital key from a target device or a user application, wherein the request includes a package, signature information of the package, and certificate information of the target device, and wherein the package includes configuration information for generating the digital key and challenge information for preventing reuse of commands; and
  transmit, to the secure element, the request to generate the digital key and first authentication information,
 wherein the secure element includes:
  a second memory storing a second program and data for processing the digital key; and
  a second processor configured to execute the second program stored in the second memory to provide a digital key application, and
 wherein the digital key application is configured to:
  verify the package, the signature information of the package, and the certificate information of the target device based on the first authentication information received from the digital key framework and a second authentication information stored in the secure element; and generate the digital key by using the configuration information included in the package.

2. The electronic device of claim 1, wherein the generated digital key is stored in the secure element.

3. The electronic device of claim 1, wherein the digital framework is further configured to:

receive a request to manage the digital key stored in the secure element from the target device;

check whether a service provider transmitting the request to manage the digital key is an authorized service provider; and in case that the service provider is the authorized service provider, transmit, to the digital key application of the secure element, the authentication information, which is stored in the digital key framework to verify the request to manage the digital key, and the request to manage the digital key, and wherein the digital key application of the secure element is configured to:

verify the request to manage the digital key, based on the first authentication information received from the digital key framework and the second authentication information stored in the secure element; and manage the digital key.

4. The electronic device of claim 1, wherein the first processor is further configured to transmit the generated digital key to a service provider server.

5. An operation method of an electronic device for processing a digital key, the operation method comprising:

receiving a request to generate the digital key from a target device or a user application by using a digital key framework, wherein the request includes a package, signature information of the package, and certificate information of the target device, and wherein the package includes configuration information for generating the digital key and challenge information for preventing reuse of commands;

transmitting, to a digital key application of a secure element, the request to generate the digital key and first authentication information to verify the package, the signature information of the package, and the certificate information of the target device;

verifying, by the digital key application of the secure element, the package, the signature information of the package, and the certificate information of the target device based on the first authentication information received from the digital key framework and second authentication information stored in the secure element; and generating the digital key by using the configuration information included in the package.

6. The operation method of claim 5, wherein the generated digital key is stored in the secure element.

7. The operation method of claim 5, wherein receiving the request to process the digital key from the target device by using the digital key framework comprises receiving a request to manage the digital key stored in the secure element from the target device by using the digital key framework, wherein transmitting the request to generate the digital key and the first authentication information to the digital key application of the secure element comprises:

checking whether a service provider transmitting the request to manage the digital key is an authorized service provider; and in case that the service provider is the authorized service provider, transmitting, to the digital key application of the secure element, the authentication information, which is stored in the digital key framework, to verify the request to manage the digital key, and the request to manage the digital key, and wherein generating the digital key by using the configuration information included in the package comprises:

verifying the request to manage the digital key by using the digital key application executed in the secure element, based on the first authentication information received from the digital key framework and the second authentication information stored in the secure element; and managing the digital key.

8. The operation method of claim 5, further comprising transmitting the generated digital key to a service provider server.

* * * * *